Sept. 23, 1924.
C. E. KENT
CAN OPENER
Filed April 23, 1923
1,509,150
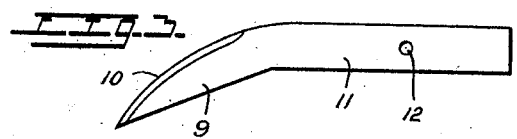
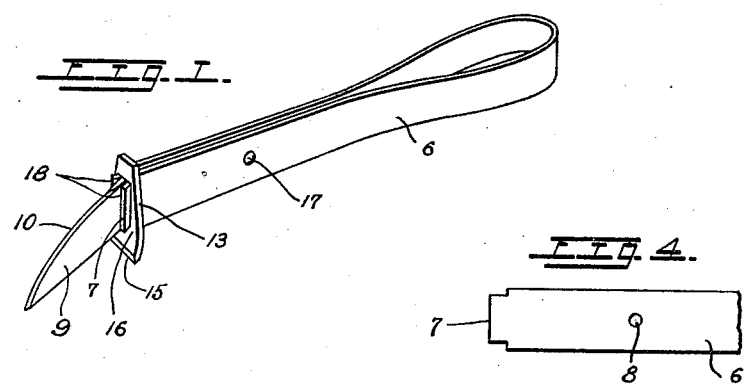
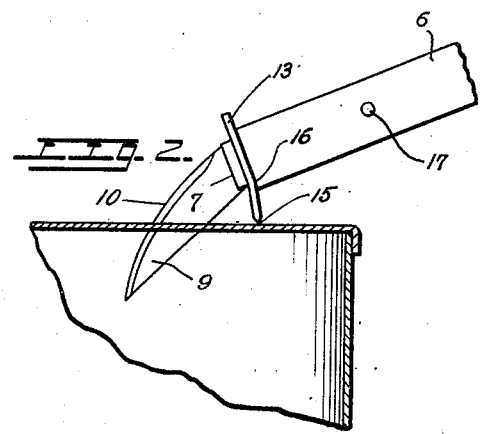
Inventor;
Charles E. Kent,
per
N.W. Crandall
Attorney.

Patented Sept. 23, 1924.

1,509,150

UNITED STATES PATENT OFFICE.

CHARLES E. KENT, OF LOS ANGELES, CALIFORNIA.

CAN OPENER.

Application filed April 23, 1923. Serial No. 634,115.

*To all whom it may concern:*

Be it known that I, CHARLES E. KENT, a citizen of the United States, residing at Los Angeles, in the county of Los Angeles and State of California, have invented a new and useful Can Opener, of which the following is a specification.

My invention relates to can openers; and among my salient objects are, first, to produce an implement of this kind that will cut by shearing with a sliding motion of the blade; second, to furnish effective non-slipable means adapted to react against the thrust of the blade in cutting; and, third, to provide a simple construction particularly adapted for manufacturing at small relative cost.

Other objects and advantages will appear hereinafter, and while I show herewith, and will describe, a preferred form of construction, I desire to be understood that I do not limit myself to such preferred form, since various changes and adaptations may be made therein without departing from the spirit of my invention as hereinafter claimed.

In the accompanying drawing Figure 1 is a perspective view of my complete device; Fig. 2 is a fragmentary elevation of the same inserted in the top of a can in position for opening it; Fig. 3 is an elevation of the cutting knife by itself; Fig. 4 is a fragmentary elevation of the operating end of the handle; and Fig. 5 is an elevation of the assembling plate, which also serves as a fulcrum in use.

Similar numerals refer to similar parts throughout the several views.

In the form of my invention herein illustrated, the handle 6 is made as a loop of steel ribbon, having its ends parallel and slightly spaced, and with tenoned ends 7. Near the respective extremities are small opposed rivet or screw holes 8.

The blade 9 has a curved cutting edge 10, and an angularly disposed shank 11 of the same width as tenons 7. The shank also has a rivet or screw hole 12 of the same size as holes 8.

The fulcrum plate 13 is trapezoidal, with a rectangular hole 14 therethrough, and having its longer parallel side sharp-edged, as at 15. The length of hole 14 is the same as the width of tenons 7 and blade shank 11, and the width of the hole is just sufficient to accommodate the two ends of the handle, and the shank of the blade. Plate 13 is bent slightly, as at 16, to better fit it for use as a fulcrum as shown in Fig. 2.

The implement is assembled by riveting the shank of the cutting blade between the two ends of the handle, through the registering holes 8 and 12, by the rivet 17; slipping plate 13 onto tenons 7 up to the shoulders; and then spreading the protruding ends of the tenons outwardly as indicated at 18 in Fig. 1.

For opening a can or the like the point of the blade is driven through the top, near the edge, in the usual manner; and the cut is made by working the handle downward leverwise, with edge 15 acting as the fulcrum on the periphery of the can. The blade works upward with a sliding cut, and the sharp edge of the fulcrum resists the thrust of the blade by biting into the material of the can. The operating position is plainly indicated in Fig. 2.

I desire to call particular attention to the fact that the blade of my can opener is easily renewable, and that the whole device comprises only three easily formed parts and one rivet.

I claim as my invention;

1. A can opener comprising; a looped handle having shouldered extremities; a blade having a downwardly curved cutting edge and an angularly disposed shank; and a pierced fulcrum plate adapted to engage said extremities with said shank therebetween.

2. A can opener comprising; a looped handle having parallel spaced legs with tenoned ends; a blade having a downwardly curved cutting edge and an angularly disposed shank; and a pierced fulcrum plate adapted to engage said ends with said shank therebetween; the extremities of said ends being bent outwardly after assembling to prevent disengagement of said plate.

CHARLES E. KENT.